(12) United States Patent
Tanahashi et al.

(10) Patent No.: US 9,120,434 B2
(45) Date of Patent: Sep. 1, 2015

(54) HIGH-VOLTAGE CABLE ROUTING STRUCTURE FOR ELECTRICALLY DRIVEN VEHICLE

(75) Inventors: Hisayuki Tanahashi, Hamamatsu (JP); Masanori Nagayoshi, Hamamatsu (JP)

(73) Assignee: Suzuki Motor Corporation (JP)

( * ) Notice: Subject to any disclaimer, the term of this patent is extended or adjusted under 35 U.S.C. 154(b) by 708 days.

(21) Appl. No.: 13/407,315

(22) Filed: Feb. 28, 2012

(65) Prior Publication Data

US 2012/0235471 A1    Sep. 20, 2012

(30) Foreign Application Priority Data

Mar. 18, 2011 (JP) ................. 2011-060944

(51) Int. Cl.
*B60L 1/00* (2006.01)
*B60L 3/00* (2006.01)
*B60R 16/02* (2006.01)
*B60K 1/00* (2006.01)

(52) U.S. Cl.
CPC ............... *B60R 16/0215* (2013.01); *B60K 1/00* (2013.01)

(58) Field of Classification Search
None
See application file for complete search history.

(56) References Cited

U.S. PATENT DOCUMENTS

| | | | |
|---|---|---|---|
| 6,936,770 B2 * | 8/2005 | Takedomi et al. ............ | 174/650 |
| 7,485,983 B2 | 2/2009 | Asao et al. | |
| 2007/0252435 A1 * | 11/2007 | Coe et al. ..................... | 307/10.1 |
| 2008/0160396 A1 | 7/2008 | Nishino | |
| 2009/0255727 A1 | 10/2009 | Tarchinski | |

FOREIGN PATENT DOCUMENTS

| | | |
|---|---|---|
| CN | 101209660 A | 7/2008 |
| CN | 101559748 A | 10/2009 |
| DE | 102004014936 A1 | 11/2004 |
| FR | 2961771 A1 | 12/2011 |
| JP | 2000092616 A | 3/2000 |
| JP | 2001328439 A | 11/2001 |
| JP | 2008-162501 A | 7/2008 |

OTHER PUBLICATIONS

Chinese Office Action for Application No. 201210070007.1 dated Mar. 31, 2014.
German Office Action for Application No. 102012005902.7 dated Nov. 15, 2013.

* cited by examiner

*Primary Examiner* — Jared Fureman
*Assistant Examiner* — Aqeel Bukhari
(74) *Attorney, Agent, or Firm* — Lerner, David, Littenberg, Krumholz & Mentlik, LLP

(57) ABSTRACT

The present invention is a high-voltage cable routing structure for an electrically driven vehicle, comprising a battery supported on a vehicle body, a high-voltage equipment including an inverter, and multiple high-voltage cables connecting connection terminals of the battery and connection terminals of the equipment to each other. The battery, equipment, and cables are mounted on the vehicle. Regarding the structure, in a mounting space in the body, the battery and the equipment are disposed at such positions as to overlap each other vertically. The terminals of the equipment positioned at the top are provided on an upper portion thereof. The cables connected to the battery and the equipment are arranged to lead out in a direction along a vehicle width direction and to curve in such a way that middle portions thereof are located away from a lateral wall surface of the equipment in a front and rear direction.

3 Claims, 4 Drawing Sheets

HIGH-VOLTAGE CABLE ROUTING STRUCTURE FOR ELECTRICALLY DRIVEN VEHICLE

CROSS-REFERENCE TO RELATED APPLICATIONS

The present application claims priority from Japanese Patent Application No. 2011-060944 filed Mar. 18, 2011, the disclosure of which is hereby incorporated herein by reference.

The present invention relates to a high-voltage cable routing structure for an electrically driven vehicle. In particular, the present invention relates to a high-voltage cable routing structure for an electrically driven vehicle which can protect high-voltage cables connecting a battery and high-voltage equipment such as an inverter mounted on the electrically driven vehicle and can provide an arrangement of the high-voltage cables suitable for the mounting of the high-voltage cables on the vehicle.

BACKGROUND OF THE INVENTION

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.
  the battery capacity should be able to be secured
  the routing should not result in unused space, lowering the space efficiency
  the high-voltage cables should be able to be assembled to the connection terminals
  a space as a path to access the connection terminals and a working space should be secured.

FIGS. 6 to 8 show a conventional high-voltage cable routing structure for an electrically driven vehicle. In FIG. 6, multiple high-voltage cables 105 connect a battery 103 which is supported on a vehicle body 102 of an electrically driven vehicle 101, and high-voltage equipment 104 which includes an inverter. The high-voltage cables 105 are low in flexibility. Thus, when the high-voltage cables 105 are bent at 90° and are assembled to connection terminals, it is mechanically desirable to set a large curvature radius r (see FIG. 7). Furthermore, for the purpose of avoiding increase in internal resistance which causes increase in amount of heat generation, and the like, it is electrically desirable as well to set a large curvature radius r for each high-voltage cable 105.

In this respect, as shown in FIG. 8, the conventional high-voltage cable routing structure for an electrically driven vehicle secures a large curvature radius r for the high-voltage cables 105 by making a recess in the battery 103 to form a recessed portion 106. As a result, a clearance can be secured between the battery 103 and curving portions of the high-voltage cables 105 (JP 2008-162501 A).

BRIEF SUMMARY OF THE INVENTION

However, the recessed portion 106 is formed by making a recess in the battery 103 as shown in FIG. 8, and thus, the routing structure of JP 2008-162501 A mentioned above reduces the battery capacity by the space of the recessed portion 106. This results in a problem that the electrically driven vehicle employing the routing structure of JP 2008-162501 A has a shorter mileage.

In addition to the securing of the battery capacity, it is necessary for the high-voltage cable routing structure to: route the high-voltage cables in away not to result in unused space, which would lower the space efficiency; allow the high-voltage cables to be assembled to the connection terminals; secure a space serving as a path to access the connection terminals and a working space; etc.

An object of the present invention is to protect high-voltage cables which connect a battery and high-voltage equipment including an inverter to each other, and is to provide routing with an improved mounting efficiency leading to a secured battery capacity and a secured assembling space.

The present invention provides a high-voltage cable routing structure for an electrically driven vehicle comprising a battery being supported on a vehicle body of the electrically driven vehicle, high-voltage equipment including an inverter, multiple high-voltage cables connecting connection terminals of the battery and connection terminals of the high-voltage equipment to each other. The battery, the high-voltage equipment, and the multiple high-voltage cables are mounted on the electrically driven vehicle. Regarding the structure, in a mounting space in the vehicle body, the battery and the high-voltage equipment are disposed at such positions as to overlap each other vertically. The connection terminals of the high-voltage equipment positioned at the top are provided on an upper portion thereof. The multiple high-voltage cables connected to the battery and the high-voltage equipment are directed so as to be led out in a direction along a vehicle width direction, and are arranged so as to be curved in such a way that middle portions thereof are located away from a lateral wall surface of the high-voltage equipment in a front and rear direction of the vehicle.

The high-voltage cable routing structure for an electrically driven vehicle of the present invention can secure a large curvature radius for the curving portions of the high-voltage cables. This makes it possible to secure workability for assembling and also performance qualities such as reduced power loss and secured durability of the high-voltage cables.

Furthermore, the high-voltage cable routing structure for an electrically driven vehicle of the present invention can create an efficient routing layout for the high-voltage cables, thereby a compact structure in which a large curvature radius can be secured for the high-voltage cables 13 without resulting in wasted space, is provided.

DETAILED DESCRIPTION OF THE INVENTION

Figure 1:
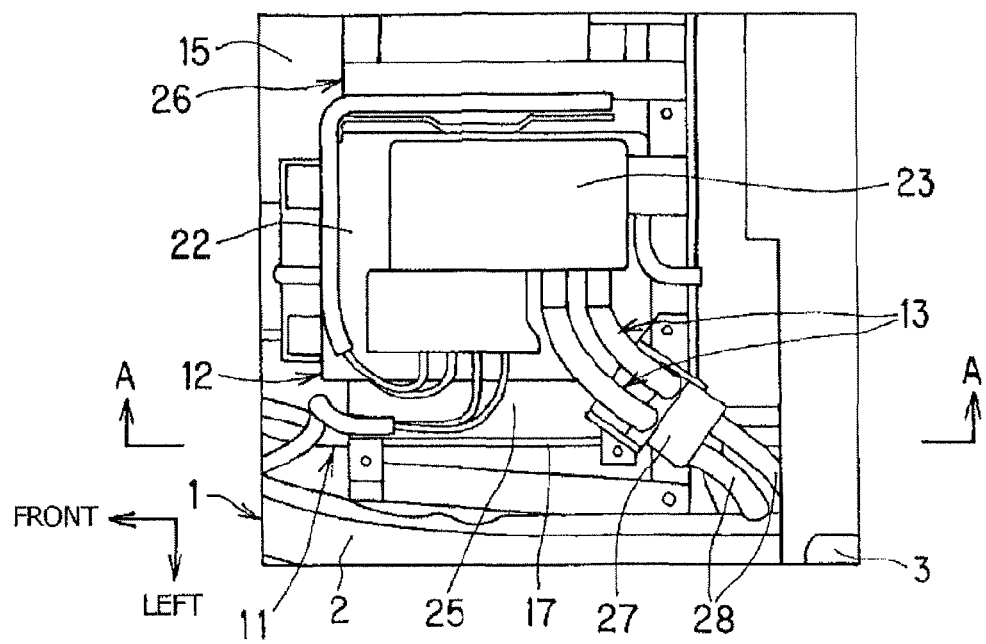
FIG. 1 is a plane view of a high-voltage cable routing structure (embodiment).

Hereinbelow, embodiments of the present invention will be described by referring to the drawings.

Embodiments

Figure 2:
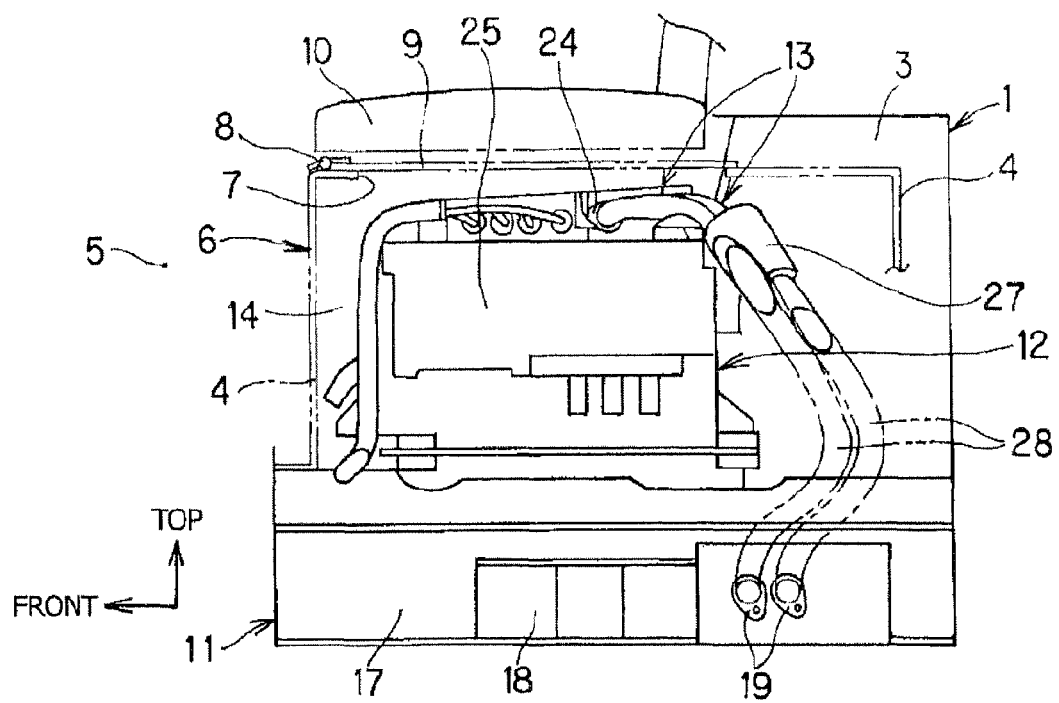
FIG. 2 is a cross-sectional view taken along the A-A line of FIG. 1 (embodiment).

FIGS. 1 to 5 show an embodiment of the present invention. In FIGS. 1 and 2, the reference numeral 1 denotes the vehicle body of an electrically driven vehicle, the reference numeral 2 denotes a floor side member as a structural part of the vehicle body 1, the reference numeral 3 denotes a pillar, the reference numeral 4 denotes a floor panel, and the reference numeral 5 denotes a cabin. In the electrically driven vehicle, a pair of left and right floor side members 2 of the vehicle body 1 has left and right pillars 3 standing thereon, respectively. The cabin 5 is formed above the floor panel 4 lying over the floor side members 2. A portion of the floor panel 4 is raised toward the cabin 5 to form a raised portion 6, and the portion is located between the floor side members 2 in the vicinity of crossing portions of the floor side members 2 and their respective pillars 3. In an upper portion of the raised portion 6, there are provided an opening 7 providing a connection to the cabin 5, and a panel lid 9 capable of opening and closing the opening 7 by being pivoted about a hinge 8. A seat 10, on which an occupant sits, is placed on top of the panel lid 9.

On the vehicle body 1 of the electrically driven vehicle, there are mounted a battery 11, high-voltage equipment 12 including an inverter, and multiple high-voltage cables 13 connecting the battery 11 and the high-voltage equipment 12. The vehicle body 1 of the electrically driven vehicle has a storage compartment 14 serving as a space to mount the battery 11 and the high-voltage equipment 12, below the seat 10 placed on top of the raised portion 6 of the floor panel 4. In the storage compartment 14, the battery 11 and the high-voltage equipment 12 are disposed at such positions as to overlap each other vertically.

The major portion of the storage compartment 14 is located at a position between positions at which the paired floor side members 2 provided on the left and right sides of the floor panel 4 cross the pillars 33 forming the cabin compartment 5, i.e., positions at which the rigidity of the vehicle body structure is high. Furthermore, the storage compartment 14 is surrounded all around by vertical walls of vehicle body panels, and is formed into a space longer in the width direction and shorter in the front and rear direction. A space under the storage compartment 14 is connected to a lower floor space which is located below the floor panel 4 between the floor side members 2 and is formed into a shape longer in the front and rear direction and shorter in the top-bottom direction.

On the opening 7 in the upper portion of the storage compartment 14, the panel lid 9 integral with the seat 10 is provided pivotally about the hinge 8. Thus, the panel lid 9 serves as a maintenance lid which allows access to the inside of the storage compartment 14, and, correspondingly, the opening 7 serves as a maintenance opening.

Figure 4:
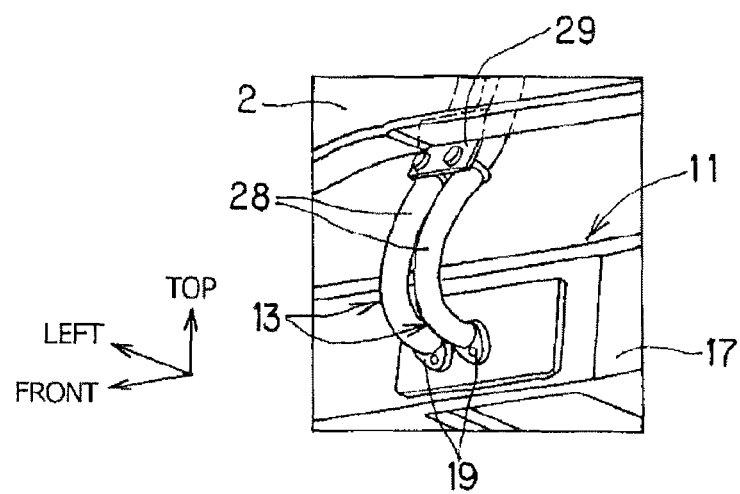
FIG. 4 is a view of the high-voltage cable routing structure viewed from a rear side (embodiment).

The battery 11 has high-voltage battery packs 16 for propelling the vehicle inside a battery case 15, which is longer in the front and rear direction and is shorter in the top-bottom direction (see FIG. 4). A highly rigid battery frame 17 for mounting the battery 11 to the vehicle body 1 is provided to the outer circumference of the battery case 15. As shown in FIG. 2, the battery frame 17 has a mount attaching portion 18 on both sides thereof at positions corresponding to the storage compartment 14. Connection terminals 19, to which the high-voltage cables 13 are connected, are arranged immediately behind the left mount attaching portion 18. The connection terminals 19 are configured such that the multiple high-voltage cables 13 may be releasably attached thereto at a side below structural parts facing the storage compartment 14 or the floor side members 2. Furthermore, the connection terminals 19 are configured such that the multiple high-voltage cables 13 may lead out in a direction along the vehicle width direction.

Figure 3:
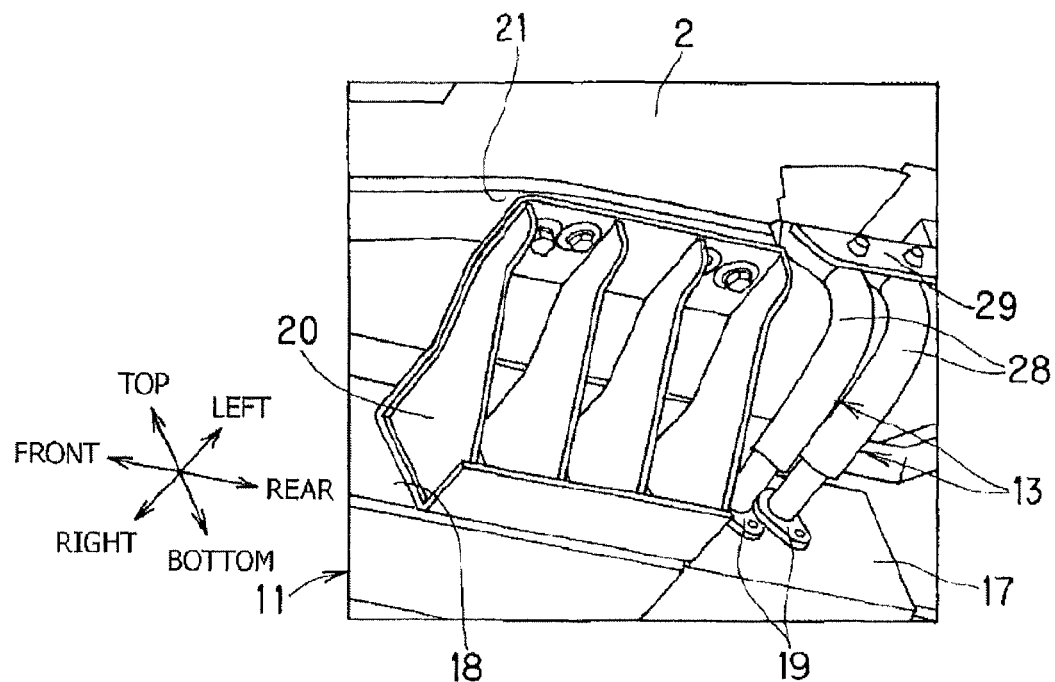
FIG. 3 is a bottom view of the high-voltage cable routing structure viewed from a front left side (embodiment).

For the battery 11, the inner ends of mounts 20 are attached to the mount attaching portions 18 on both sides of the battery frame 17, respectively, and the outer ends of the mounts 20 are attached to mount attaching portions 21 on the lower surfaces of the left and right floor side members 2, respectively (see FIG. 3). As a result, the battery 11 is disposed in the lower floor space being located under the floor panel 4, being longer in the front and rear direction, and being shorter in the top-bottom direction. Furthermore, the battery 11 is attached and supported on the paired left and right floor side members 2 at positions beside the storage compartment 14.

As shown in FIGS. 1, 2, and 4, the high-voltage equipment 12 has an upwardly projecting portion 23 which projects upward on the upper surface of a main unit 22 of a square box shape. Connection terminals 24, to which the high-voltage cables 13 are connected, are arranged at the left surface of the upwardly projecting portion 23. The connection terminals 24 are configured such that the multiple high-voltage cables 13 may be detachably attachable thereto at the seat 10 side, which is above the structural parts facing the storage compartment 14 or the floor side members 2. Furthermore, the connection terminals 24 are configured such that the multiple high-voltage cables 13 may lead out in a direction along the vehicle width direction. The high-voltage equipment 12 has a laterally projecting portion 25 which projects outward on one of the lateral surfaces of the main unit 22 located outermost in the vehicle width direction. High-voltage cables are connected to the laterally projecting portion 25 from below, and the high-voltage cables extend from the high-voltage equipment 12 to a drive motor.

The high-voltage equipment 12 is attached to a sub frame 26 which serves as a cross member laid between the paired left and right floor side members 2 on both sides of the storage compartment 14. In the storage compartment 14, the high-voltage equipment 12 attached to the sub frame 26 is such that the upwardly projecting portion 23 on the upper side faces the opening 17 in the upper portion of the raised portion 6. The position at which the high-voltage cables 13 connected to the high-voltage equipment 12 lead out therefrom (the position of the connection terminals 24), is shifted in the vehicle front and rear direction from the position at which the high-voltage cables 13 connected to the battery 11 lead out therefrom (the position of the connection terminals 19).

The multiple high-voltage cables 13, connecting the battery 11 and the high-voltage equipment 12, include: a P-side high-voltage cable connected to a positive side (+) at a higher potential; and an N-side high-voltage cable connected a negative side (−) at a lower potential. Cables including these are regarded as multiple high-voltage cables 13, even if they are bundled by a protection member and appear as a single cable.

The multiple high-voltage cables 13 are connected at one end to the connection terminals 24 of the upwardly projecting portion 23 provided to the main unit 22 of the high-voltage equipment 12. The upwardly projecting portion 23 is arranged on the upper surface of the main unit 22 at a position closer in the vehicle width direction to the center line of the vehicle than are other positions on the upper surface. As shown in FIGS. 1 and 2, the high-voltage cables 13 connected to the connection terminals 24 of the upwardly projecting portion 23, extend along the upper surface of the main unit 22 in a direction along the vehicle width direction (i.e. leftward), then curve rearward gradually, and thereafter extend to pass through an area rearward of the rear end surface. A bracket 27 is attached to a corner portion of the main unit 22 of the high-voltage equipment 12 lying across the upper surface and the rear or left surface of the main unit 22. With this bracket 27, the high-voltage cables 13 extending rearward, are supported on the main unit 22.

The high-voltage cables 13 extending from the bracket 27 on the high-voltage equipment 12, extend downward while curving in such a way that their middle portions 28 are located away from the lateral wall surface of the main unit 22 in the front and rear direction. As shown in FIG. 2, in a side view, the middle portions 28 pass through such a position as to overlap the pillars 3 forming the cabin compartment 5. Furthermore, as shown in FIG. 1, in a plan view, the middle portions 28 sway slightly outward in the vehicle width direction, and portions thereof nearer the connection terminals 19 are brought to the vicinity of the structural part of the vehicle body 1, or the floor side member 2.

Figure 5:
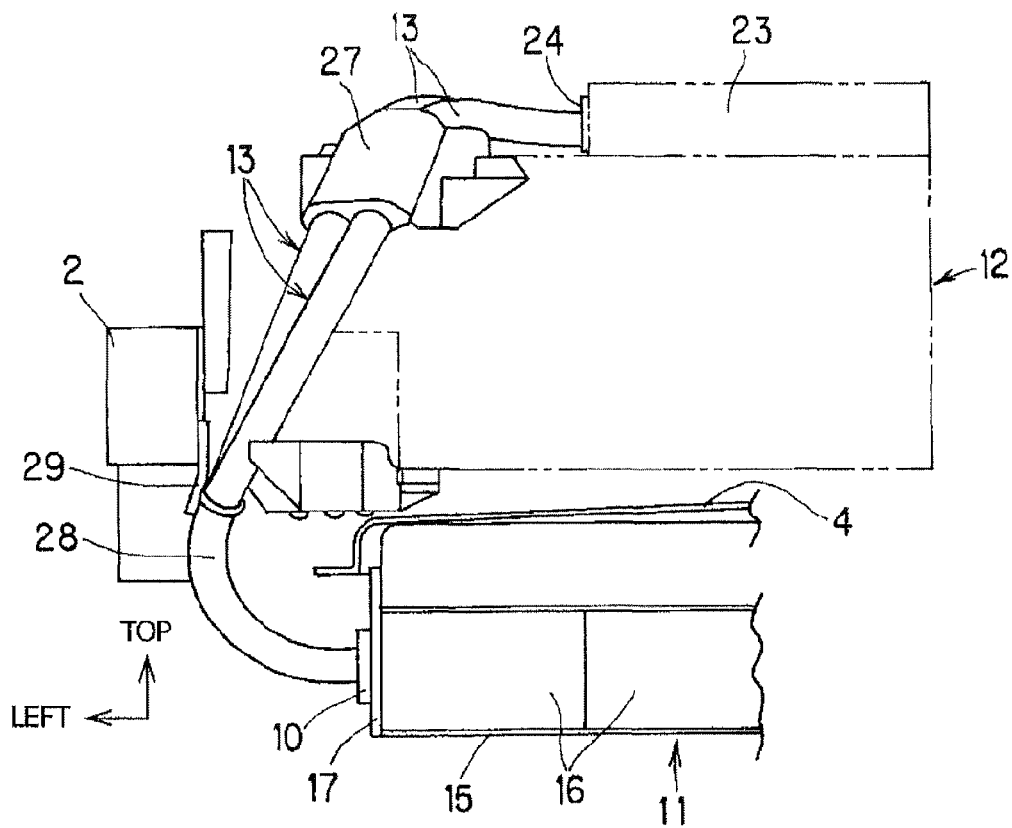
FIG. 5 is a bottom view of middle portions of high-voltage cables viewed from a rear left side (embodiment).
Figure 6:
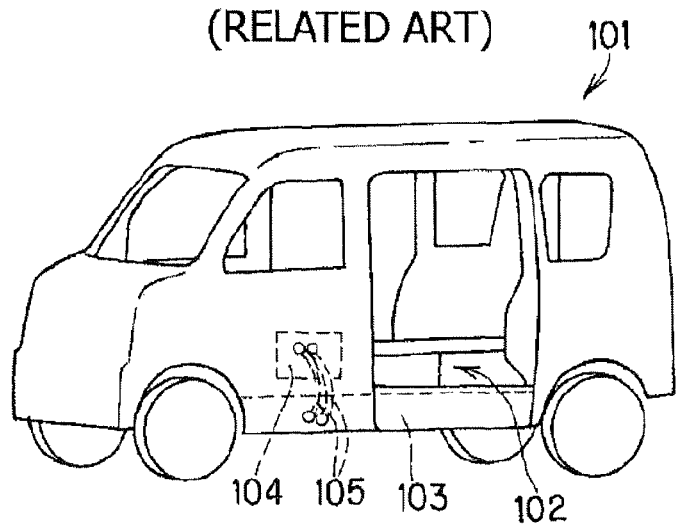
FIG. 6 is a view of an electrically driven vehicle viewed from a front left side (conventional example).
Figure 7:
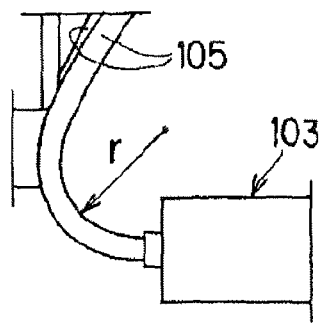
FIG. 7 is a view of middle portions of high-voltage cables viewed from a rear side (conventional example).
Figure 8:
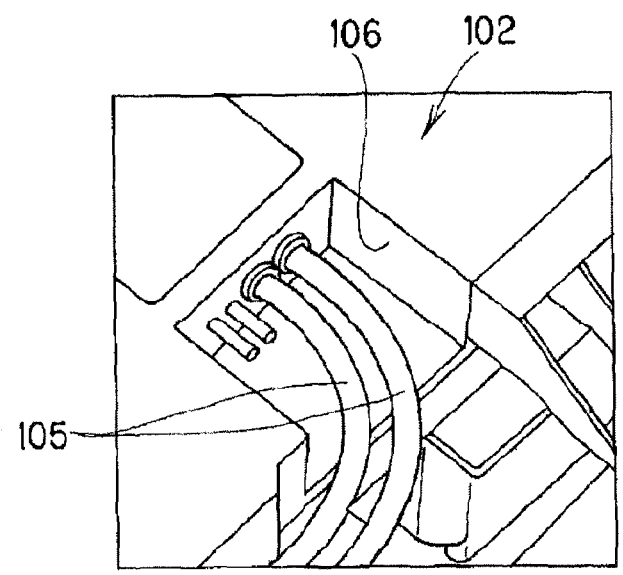
FIG. 8 is a top view of a high-voltage cable routing structure viewed from a front left side (conventional example).

As shown in FIGS. 3 to 5, a bracket 29 is attached to a portion of the floor side member 2 which is close to the portions of the middle portions 28 nearer the connection terminals 19. The curving middle portions 28 of the high-voltage cables 13 are tilted and supported on the floor side member 2 with this bracket 29. Furthermore, in the closed cross section of the floor side member 2, the inner lateral surface around the bottom corner is where the bracket 29 is attached, as shown in FIG. 4.

The middle portions 28 of the high-voltage cables 13 extending from the bracket 29 on the floor side member 2, extend downward while curving gradually toward the front from the rear, then extend in a direction along the vehicle width direction (i.e. rightward), and finally are connected at the other end to the connection terminals 19 of the battery 11.

Note that although one of the paired floor side members 2 provided on the left and right sides, has been described as the structural part of the vehicle body 1 which is closer to the middle portions 28 of the high-voltage cables 13, the cross member or sub frame may be the structural part. Furthermore, the bottom surface of the portion of the floor side member 2 to which the bracket 29 is attached, is set higher than the bottom surface of a portion to which the battery 11 is attached.

As described above, regarding the routing structure of the high-voltage cables 13, in the storage compartment 14 serving as a mounting space in the vehicle body 1, the battery 11 and the high-voltage equipment 12 are disposed at such positions as to overlap each other vertically. The connection terminals 24 of the high-voltage equipment 12 are positioned at the top are provided on an upper portion thereof. The multiple high-voltage cables 13 connected to the battery 11 and the high-voltage equipment 12, are directed to be led out in a direction along the vehicle width direction, and the multiple high-voltage cables 13 are arranged to be curved in such a way that the middle portions 28 of the multiple high-voltage cables 13 are located away from the lateral wall surface of the high-voltage equipment 13 in the front and rear direction of the vehicle.

Accordingly, the routing structure of the high-voltage cables 13 can secure a large curvature radius for the curving portions of the high-voltage cables 13. This makes it possible to secure workability for assembling and also performance qualities such as reduced power loss and secured durability of the high-voltage cables 13. Furthermore, an efficient routing layout can be created for the high-voltage cables 13, and thereby a compact structure in which a large curvature radius can be secured for the high-voltage cables 13 without wasted space, is provided.

In the routing structure of the high-voltage cables 13, the curving middle portions 28 of the multiple high-voltage cables 13 are arranged in the vicinity of the structural part of the vehicle body 1, or the floor side member 2. The curving middle portions 28 of the multiple high-voltage cables 13 are supported on the floor side member 2 through the bracket 29. Accordingly, the postures of the routed high-voltage cables 13 can be maintained stably, and floating of high-voltage cables 13 and interfering with other parts can be avoided. Since the portion of each middle portion 28 supported by the bracket 29 is a portion nearer the connection terminals 19, the workability for assembling can be improved.

In the routing structure of the high-voltage cables 13, the mounting space is configured in the storage compartment 14 arranged under the seat 10. The structural part is the floor side member 2 of the vehicle body 1, and the floor side member 2 faces the storage compartment 14. The connection terminals 24 of the high-voltage equipment 12 are provided such that the multiple high-voltage cables 13 are releasably attached thereto at the seat 10 side which is above the floor side member 2. The connection terminals 19 of the battery 11 are provided such that the multiple high-voltage cables 13 are releasably attached thereto at a side below the floor side member 2.

Accordingly, in the routing structure of the high-voltage cables 13, the high-voltage cables 13 are routed at a position between the floor side members 2, and the floor side members 2 are highly rigid portions of the vehicle body 1. This makes it possible to secure a high protection performance and a high attachment stiffness for each part even in a case of compact routing. Furthermore, the orientations of the high-voltage cables 13 inside the vehicle body 1 can be stably supported. This facilitates the work of attaching and detaching the high-voltage cables 13 to and from the connection terminals 19 and 24 in mutually separated locations.

In addition, in the routing structure of the high-voltage cables 13, the storage compartment 14 is disposed at a position between the crossing portions of the pair of floor side members 2 and the pair of pillars 3, each of the pairs is provided on the left and right sides of the vehicle body 1, and the curving middle portions 28 of the multiple high-voltage cables 13 are routed at such a position as to overlap the pillars 3 in a side view.

As described above, in the routing structure of the high-voltage cables 13, the high-voltage equipment 12 is mounted at a position between the crossing portions of the floor side members 2 and the pillars 3, and the floor side members 2 and the pillars 3 are extremely rigid portions of the vehicle body 1. Furthermore, the high-voltage cables 13 are routed to substantially overlap with the pillars 3. Hence, the protection performance from the outside can be secured.

By attaching the battery frame 17 to the lower surfaces of the floor side members 2 through the mounts 20, the battery 11 is provided in such an offset manner that the battery case 15 housing the battery packs 16 may be positioned below the floor side members 2. A space produced by this facilitates arranging the high-voltage cables 13. Furthermore, the mounts 20 of the battery frame 17 help protect the high-voltage cables 13.

The storage compartment 14 is a space being joined to, being supported on, and being closed by the battery frame 17 of the battery 11 and the sub frame 26 of the high-voltage equipment 26, the battery frame 17 lies across and is supported on the floor side members 2 on both sides of the storage compartment (projection thereof) 14 through the mounts 20, and the sub frame 26 is provided between the floor side members 2 on both sides of the storage compartment (projection thereof). Thus, the storage compartment 14 is configured as a firmly protected space.

Note that the high-voltage equipment 12 may be: attached to the sub frame 26 serving as a cross member lying across the paired left and right floor side members 2; gathered and assembled with other electric devices; and then mounted on the vehicle body 1. In addition, although the battery 11 is disposed at the bottom and the high-voltage equipment 12 is disposed at the top, the battery 11 may be disposed at the top and the high-voltage equipment 12 may be disposed at the bottom. This arrangement is possible in a case of a small-sized battery 11 having a small capacity.

The present invention protects high-voltage cables and provides an improved mounting efficiency which leads to a secured battery capacity and a secured assembling space. The present invention is applicable to the mounting of not only high-voltage cables but also other ropelike objects, such as hoses or wires, to a vehicle body.

What is claimed is:

1. A high-voltage cable routing structure for an electrically driven vehicle, comprising:
    a battery supported in a vehicle body of the electrically driven vehicle;
    a high-voltage equipment including an inverter; and
    a plurality of high-voltage cables connecting connection terminals of the battery and connection terminals of the high-voltage equipment to each other;
    wherein the battery, the high-voltage equipment, and the plurality of high-voltage cables are mounted in the electrically driven vehicle;
    wherein in a mounting space in the vehicle body, the battery and the high-voltage equipment are disposed at positions so as to overlap each other vertically, and the connection terminals of the high-voltage equipment positioned at the top are provided on an upper portion thereof;
    wherein the plurality of high-voltage cables connected to the battery and the high-voltage equipment, are directed so as to be led out in a direction along a vehicle width direction, and are arranged so as to be curved in such a way that middle portions thereof are located away from a lateral wall surface of the high-voltage equipment in both a vehicle width direction and a front and rear direction of the vehicle;
    wherein the middle portions of the plurality of high-voltage cables are curved;
    wherein the middle portions are arranged in a vicinity of a structural part of the vehicle body;
    wherein two brackets are attached to the structural part of the vehicle body;
    wherein the curved middle portions of the plurality of high-voltage cables are supported on the brackets;
    wherein each of the plurality of high-voltage cables is led out from the high-voltage equipment, is then curved rearward gradually, and thereafter, is extended downward so as to be passed through an area rearward of a rear end surface, in the front and rear direction of the vehicle, of the high voltage equipment; and
    wherein the middle portion of each of the plurality of high-voltage cables is extended downward from one of the brackets so as to be located away from the lateral wall surface of the high-voltage equipment in the front and rear direction of the vehicle, and is then extended downward from another of the brackets while being curved gradually toward a front of the vehicle from a rear thereof.

2. A high-voltage cable routing structure for the electrically driven vehicle according to claim 1, wherein:
    the mounting space is configured as a storage compartment arranged under a seat,
    the structural part is a floor side member of the vehicle body,
    the floor side member faces the storage compartment,
    the connection terminals of the high-voltage equipment are configured to be releasably attached to the plurality of high-voltage cables at a side of the seat above the floor side member, and
    the connection terminals of the battery are configured to be releasably attached to the plurality of high-voltage cables at a side below the floor side member.

3. A high-voltage cable routing structure for the electrically driven vehicle according to claim 2, wherein
    the storage compartment is disposed at a position between crossing portions of a pair of the floor side members and a pair of pillars of the vehicle body,
    each of the pairs is provided on left and right sides of the vehicle body, and
    the curving middle portions of the plurality of high-voltage cables are routed at such a position as to overlap the pillars in a side view.

* * * * *